Jan. 9, 1968

G. A. SOFER ETAL 3,362,882

FAST BREEDER NUCLEAR REACTOR

Filed June 16, 1964

INVENTORS
GEORGE A. SOFER
ABDUL H. KAZI

BY

ATTORNEYS

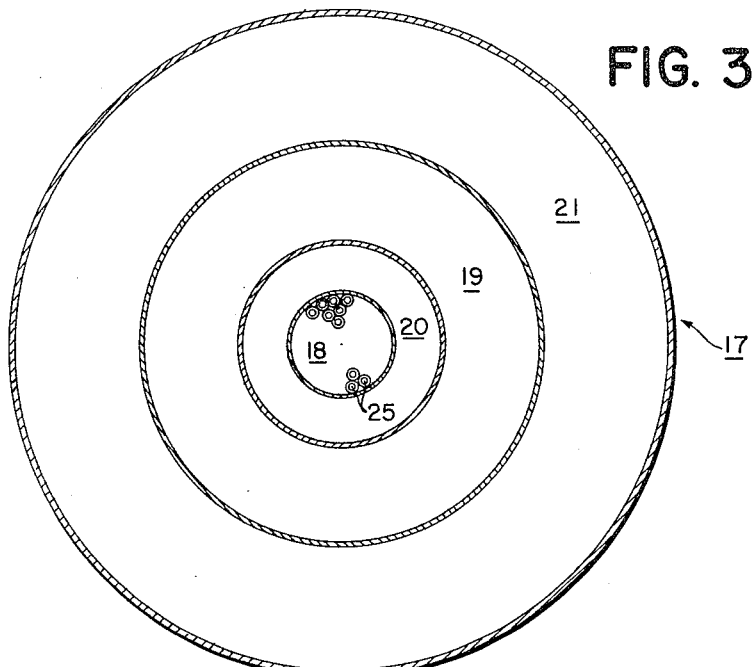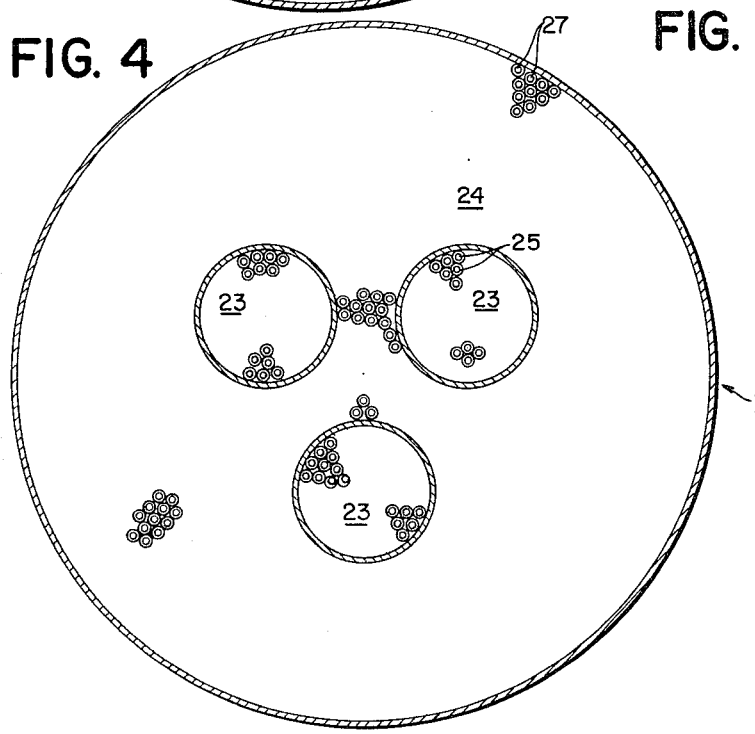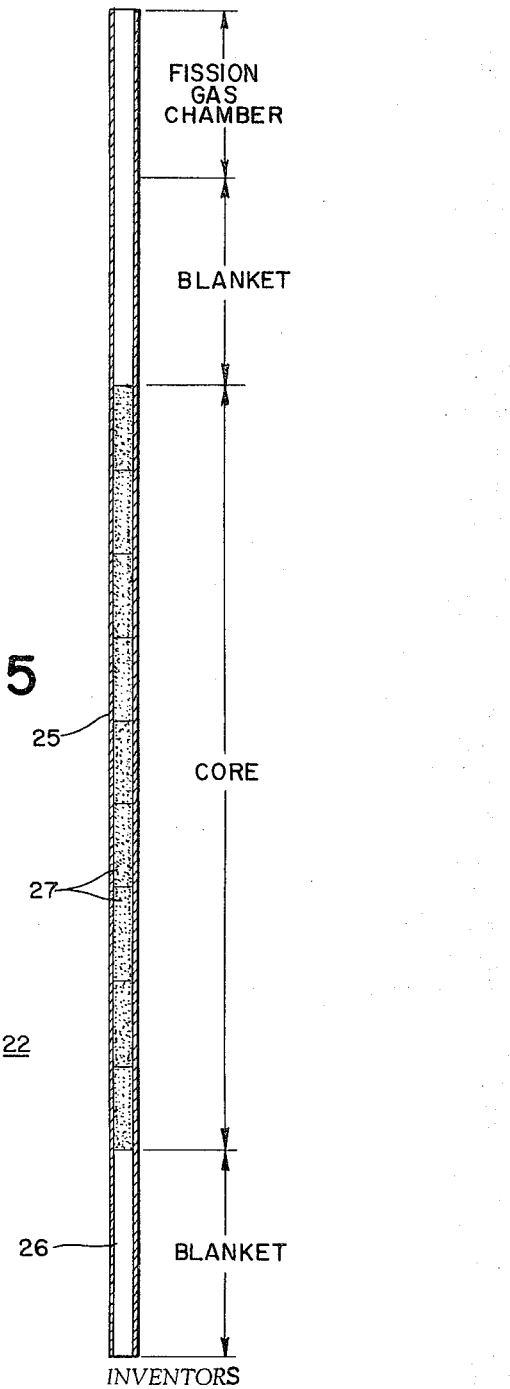

3,362,882
FAST BREEDER NUCLEAR REACTOR

George A. Sofer, White Plains, and Abdul H. Kazi, Briarcliff Manor, N.Y., assignors to United Nuclear Corporation, White Plains, N.Y., a corporation of Delaware
Filed June 16, 1964, Ser. No. 375,562
14 Claims. (Cl. 176—18)

This invention relates to nuclear reactors and, more particularly, to a large fast breeder which has a negative coolant void coefficient of reactivity. A fast breeder is defined herein as a fast nuclear reactor in which the neutrons are at an average energy in excess of about 0.1 mev. and which contains fertile material for breeding of fissile material.

Large fast breeders appear to hold most promise for economic production of power and for high breeding gains of fissile materials. However, analytical studies have shown that they have a potential safety problem due to the possibility of having a positive void coefficient of reactivity which may cause a disastrous reactor runaway. This positive void coefficient is the result of competing factors created, for example, by the loss of coolant in the reactor causing the hardening of neutron spectrum and leading to the following competing effects:

(1) Reduction of neutron captures leading to an increase in reactivity. This effect depends strongly on the variation of $\alpha$ (capture cross section/fission cross section) with energy for the fissile and fertile material (i.e., it depends on the nature of the fuel).

(2) Reduction of scattering resulting in an increase of leakage from core to blanket leading to a reduction of reactivity. This effect depends strongly on the core geometry.

The net effect of these two competing influences is usually negative for small reactors where the leakage from the core of fissile material to the blanket of fertile material is relatively large and, therefore, an increase of leakage overrides the decrease in capture. For larger fast breeders, the core to blanket neutron leakage is reduced. Consequently, upon spectrum hardening, the loss of capture influences can override the increase in leakage thereby resulting in a net positive effect on the reactivity.

Various approaches have been proposed for producing a negative void coefficient by increasing the leakage component of the coefficient which can be accomplished, for example, by the reduction of $L/D$ ratio. This approach leads to the design of pancake core reactors (i.e., large core diameter and small core height), which in itself is a severe limitation in that an excessively large diameter reactor vessel is required to insure high neutron leakage for avoiding a positive void coefficient with the consequence of high pressure vessel cost. Other measures, such as increasing the volume fraction of the sodium coolant in a sodium cooled reactor or replacing $H_2O$ with $D_2O$ in a steam cooled reactor, which are used to reduce the positive void coefficient, also have their drawbacks. In the case of the sodium cooled reactor, increasing the coolant volume fraction reduces the breeding gain and in the latter case unnecessary $D_2O$ inventory increases the operating and capital costs. It is apparent, therefore, that, according to the present technology, it is possible to reduce the void coefficient by using a smaller $L/D$ ratio and other measures as previously stated, but a practical design with reasonable reactor vessel dimensions could not be obtained even for a relatively small fast breeder. This is especially true for a steam cooled fast breeder because of stronger spectrum hardening influence due to the loss of the coolant.

We have found that this problem can be completely overcome by using multiple fuel regions in the reactor. Broadly stated, the fast breeder nuclear reactor of this invention, which has a negative void coefficient comprises at least two fuel regions containing fissile material. The fuel regions are separated by at least one internal blanket of fertile material by a distance sufficient to avoid substantially direct interaction of the fuel regions. An external blanket of fertile material surrounding the fuel regions and cooling means are provided in the reactor with the latter used for removing the thermal nuclear energy generated therein.

Among suitable fissile materials for the breeder of this invention, are uranium-235, uranium-233 and plutonium-239 containing materials with above 10% enrichment in fissionable isotopes which are preferably in the form of ceramic fuel elements such as $(PuU)O_2$, $(PuU)C$, $(UTh)O_2$, and $(UTh)C$. The suitable fertile materials for the blanket include thorium-232 and uranium-238 containing materials. For example, the natural and depleted uranium oxides are found to be eminently suitable as blanket materials.

The thickness of the internal blanket is selected so that there is more than two times the mean free path of neutrons under void conditions to provide a separation between fuel regions which is sufficient to insure substantially no direct interaction between the various fuel regions even under voided conditions. This thickness varies in accordance with the geometry of the reactor, fuel materials and the blanket material, etc. For example, in a steam cooled Pu-239, U-238 ceramic fast breeder, an internal blanket thickness of 6 inches was found to be sufficient. On the other hand, for a sodium cooled plutonium-uranium system, a thickness greater than 6 inches is indicated. Internal blanket thickness greater than required for the isolation of fuel regions from direct interaction is not necessary. This would only increase the reactor size and fuel requirements. Further to illustrate applicants' invention, specific embodiments of applicants' invention are described hereinbelow with reference to the accompanying drawings wherein FIG. 1 shows a schematic diagram of a fast breeder containing superimposed layers of fuel regions separated by internal blankets.

FIGS. 3 and 4 show two additional embodiments of this invention, and

FIG. 5 shows a fuel element suitable for use in the reactors shown in FIGS. 3 and 4.

Figure 1:
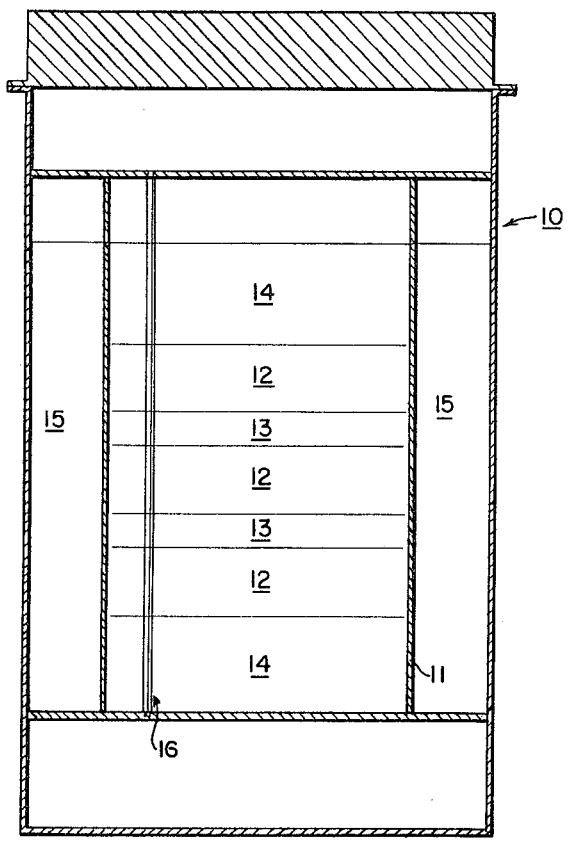

Referring initially to FIG. 1, the cylindrical fast breeder 10 of this invention comprises a center reactor portion 11 containing three superimposed layers of fuel regions 12 of fissile material separated by interposing internal blankets 13 of fertile material. The axial layers of fuel regions, and the internal blankets are surrounded by an external blanket of fertile material which consists of top and bottom axial external blankets 14 and circumferential blanket 15. Cooling channels (not shown) are provided in the reactor to remove the thermal nuclear energy generated therein.

Figure 2:
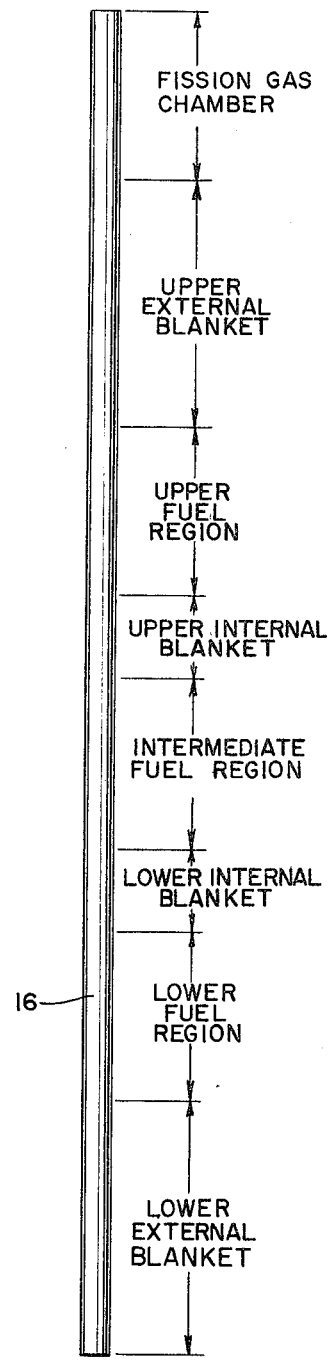
FIG. 2 shows a typical fuel element used in the reactor shown in FIG. 1.

Any suitable method may be used to load the reactor with the fuel and fertile materials in an arrangement in accordance with the teaching of the invention. We find fuel rods loaded with alternating layers of blanket material and fissile material, as shown in FIG. 2, can be used advantageously. These rods 16 which are positioned vertically in the reactor have a fission gas chamber at the uppermost portion of the rods for collecting gas generated during the operation of the reactor. The alternating layers of blankets and fuels are arranged in the order of from bottom to top, lower external blanket, lower fuel region, lower internal blanket, intermediate fuel region, upper internal blanket, upper fuel region, and upper external blanket. While the specific embodiment shown in FIGS. 1 and 2 uses three-layered core in the reactor, two-layered, or more, cores can also be used depending on the reactor power and other reactor characteristics and provided that they are separated by at least one layer of internal blanket at a distance sufficient to avoid direct interaction of the fuel layers.

For a steam cooled ceramic $(UPu)O_2$ fast breeder reactor, typical fuel and blanket loadings in each fuel rod of ¼ inch O.D. consist of the following:

(a) 1¼ feet of depleted $UO_2$ (lower external blanket)
(b) 1 foot of $(PuU)O_2$ (ratio of fissile to fertile material 12 to 15%), (lower fuel region)
(c) 6 inches depleted $UO_2$ (lower internal blanket)
(d) 1 foot $(PuU)O_2$ (intermediate fuel region)
(e) 6 inches depleted $UO_2$ (upper internal blanket)
(f) 1 foot $(PuU)O_2$ (upper fuel region)
(g) 1¼ feet depleted $UO_2$ (upper axial blanket)

To illustrate the cooling void reactivity effect, steam cooled ceramic U-Pu reactor systems of various geometries and powers are used for analytic studies. The results are tabulated in Table 1. The calculations were performed using DTF, the revised FORTRAN-63 version of DSN transport theory code, and the 16 group Hanson-Roach cross-section set (L. D. Connolly, Los Alamos Group— Averaged Cross Sections Lams-2941, September 24, 1963).

have an acceptable negative voiding effect in a single core region fast breeder, extreme pancaking of the core is required as illustrated in Example VII. The multiple fuel regions design, on the other hand, leads to an acceptable over-all reactor height to diameter relationship.

These examples further indicate that the enrichment, and hence critical mass requirements, are lower for a multiple fuel regions reactor than that of a single pancaked core reactor of equal power capability as illustrated by Examples III and VII in which the critical mass for the multilayered core is 2284 as compared with 2750 kg. of plutonium-239 for the pancaked core. Inspecting Examples V and VI also lead to the conclusion that once a negative void effect is obtained, increasing the hydrogen density as may be done by going to higher steam pressures and possibly using supercritical steam leads to more negative void effects and hence increased safety. Furthermore, increasing the steam pressure also increases the specific power of the reactor to approach that of the metal cooled fast breeder. By contrast, the steam void effect is more positive at higher steam pressure for core geometry where the steam voiding leads to a positive reactivity effect. All the calculations take anisotropic scattering of neutron in hydrogen into account with the exception of Example IV. Comparing this example with a similar exam- TABLE 1.—COOLANT VOID CHARACTERISTICS OF STEAM-COOLED $(UPu)O_2$ FAST BREEDER REACTORS

| Ex. No. | Approximate Power mwe. | Core Configuration | Total Reactor | | Thickness of Core Region(s), ft. | Volume of Core Region(s), liters | Core Enrichment, Percent $Pu^{239}$ | Steam Void Effect, $\Delta k/k$, Percent | Remarks |
|---|---|---|---|---|---|---|---|---|---|
| | | | Height, ft. | Equivalent Diameter, ft. | | | | | |
| 1 | 300 | Single core region | | | [1] 3.2 | 3,900 | 11.12 | +0.087 (steam density reduced by 50% throughout reactor). +0.586 [2] +0.246 (steam density reduced 100% in core only). | Spherical geometry. |
| 2 | | Three core layers [3] | 6.50 | | [4] 1.0 | | 12.55 | −1.15 [2] −2.27 (steam density reduced 100% in core only). | Infinite slab geometry. |
| 3 | 340 | ...do... | 6.50 | 8.08 | 1.0 | 4,350 | 14.75 | −1.86 [2] | Finite slab geometry. |
| 4 | 340 | ...do... | 6.50 | 8.08 | 1.0 | 4,350 | 14.80 | −1.71 [2] | Hydrogen isotropic.[5] |
| 5 | 113 | One core layer | 3.50 | 8.08 | 1.0 | 1,450 | 20.00 | −1.53 [2] | |
| 6 | 113 | ...do... | 3.50 | 8.08 | 1.0 | 1,450 | 19.35 | −4.58 [2] | Double hydrogen concentration of reference design (1,415 p.s.i.a./945° F.). |
| 7 | 340 | ...do... | 3.50 | 13.85 | 1.0 | 4,350 | ~17.75 | ([6]) | Estimated from examples 1, 2, and 5. |
| 8 | 250 | Two core layers | 4.175 | 8.35 | 1.0 | 3,200 | 16.88 | −0.53 [2] | Cylindrical geometry. |

[1] Radius.
[2] Reactivity effect due to reduction of steam density by 100% in entire reactor except where noted.
[3] Calculated in slab geometry except for examples 1 and 8.
[4] In all multicore reactors the 1.0 ft. thick core regions are separated by 0.5 ft. wide inner-blanket regions. Outer blankets are 1.25 ft. wide.
[5] All calculations except example 4 take anisotropic hydrogen scattering in the $P_1$ approximation into account.
[6] Void effect not computed. Estimated to be similar to Example 3.

Example I uses a single core region spherical geometry design and Examples II, III, and IV use multiple layered core design of the invention. Examples V and VI are a one-core layer reactor with lower reactor power while Examples VII and VIII use single-layered core and two-layered core designs with approximate powers of 340 and 250, respectively.

These examples indicate that a negative steam voiding effect can be obtained by subdividing the reactor core region and introducing blanket regions between the divided core regions to increase neutron leakage from the core regions. This effect is most apparent by comparing Examples I and III. Example I which uses a single core region design has a prohibitive positive void coefficient while in contrast a negative void coefficient is obtained in Example III using a multiple fuel regions design. Both reactors have about equal power capability. In order to ple shows that the anisotropic scattering of hydrogen leads to increased leakage and contributes to making the void effect more negative.

The effect of using the multiple fuel regions construction on the breeding ratio is given in Table 2 which lists the breeding ratio and enrichment of the 300 mwe. designs of Examples I and II. The results indicate a small increase in total breeding ratio with a multiple fuel region reactor. The distribution of breeding between core and blankets is markedly different for a single region and multiple fuel regions reactors. The analysis study is based on a 16 group $DS_4$ calculations using DTF. The breeding ratio is defined as the ratio of capture in fertile material (Pu-240, Pu-242 and U-238) in the region of interest to absorption in fissile material (Pu-239, Pu-241 and U-235) in the entire reactor. The total breeding ratio obtained for the single core design is 1.35 as compared to 1.37 for the multiple region reactor.

TABLE 2.—BREEDING RATIO CALCULATIONS OF SINGLE AND MULTIPLE CORE REGION 300 mwe. STEAM-COOLED FAST BREEDER REACTORS

[Single-Region Core]

|  | Initial | Equilibrium |
|---|---|---|
| Core Radius, ft | 3.2 | 3.2 |
| Core Volume, liters | 3,900 | 3,900 |
| Blanket Thickness, ft | 1.25 | 1.25 |
| Total Reactor Radius, ft | 4.45 | 4.45 |
| Enrichment, fissible Pu/U+Pu, Percent | 11.12 | 10.81 |
| Reactor Steam Void Effect, percent δk/k | +0.586 | |
| Critical Mass, Ks, fissile Pu | 1,430 | 1,390 |
| Core Breeding Ratio | 0.936 | 0.920 |
| Blanket Breeding Ratio | 0.410 | 0.432 |
| Total Breeding Ratio | 1.346 | 1.352 |

[Multiple-Region Core]

| | |
|---|---|
| Core region thickness, ft. | 1.0 |
| Inner blanket thickness, ft. | 0.5 |
| Outer blanket thickness, ft. | 1.25 |
| Reactor thickness, ft. | 6.50 |
| Enrichment, Pu$^{239}$/U+Pu, percent | 12.55 |
| Reactor steam void effect, percent δk/k | −1.15 |

Initial breeding ratios:
| | |
|---|---|
| Central core region | 0.301 |
| Outer core regions (two) | 0.424 |
| Total core | 0.725 |
| Inner blanket regions (two) | 0.350 |
| Outer blanket regions (two) | 0.296 |
| Total blanket | 0.646 |
| Total breeding ratio | 1.371 |

The equilibrium concentrations used are given in Table 3. The uranium-238 in all cases contains 0.4 weight percent ranium-235.

TABLE 3.—EQUILIBRIUM CONCENTRATIONS IN STEAM-COOLED FAST BREEDER

| | Ratio of isotope atom density to U$^{238}$ atom density |
|---|---|
| U$^{238}$ | 1.0000 |
| Pu$^{239}$ | 0.1378 |
| Pu$^{240}$ | 0.0679 |
| Pu$^{241}$ | 0.0131 |
| Pu$^{242}$ | 0.0060 |
| F.P. | 0.0754 |

The influence of equilibrium isotopic concentration results in a slight decrease in core breeding ratio due to the build-up of fission fragments, and a slight increase in blanket breeding ratio due to the build-up of plutonium. The total breeding ratio stays essentially unchanged.

Analysis studies on various similar reactor systems using sodium as coolant also point up the problem of positive void coefficient. We found a multiple fuel regions design of this invention produces an acceptable negative void coefficient without going to the extreme of severe pancaking the reactor core. The principal nuclear phenomena, leakage and spectrum hardening, behind the sodium coolant void effect are similar to those in the steam coolant void effect. A steam-cooled core, however, has a softer spectrum than the core cooled by sodium which enhances the spectrum hardening effect and gives the steam-cooled reactor a more positive voiding effect.

While the examples use a U–Pu reactor system for illustration, similar benefits from multiple fuel regions design are also obtained by using other breeder cycles such as U–233–Th–232, U–235–U–238, and Pu–239–Th–232, which have less positive voiding effects than that of U–Pu cycle. We found that, by increasing the number of fuel regions, a fast breeder of 1000 mwe. or larger can be built using these breeder cycles to produce an acceptable height to diameter ratio reactor vessel.

In addition to the multi-layered core arrangement shown in FIGS. 1 and 2, other multiple fuel arrangements are possible. Two additional embodiments of this invention are shown in FIGS. 3 and 4. Reference is now made of FIG. 3 which shows the cross section of a cylindrical fast breeder 17 of this invention. The reactor 17 comprises fuel regions 18 and 19 containing fissile materials concentrically arranged and separated by an annular internal blanket 20 containing fertile material. The outer annular fuel region is surrounded by an external blanket 21. The thickness of the internal blanket 20 should be several times that of a free mean path of neutron in void condition to avoid substantially direct interaction between the core regions 18 and 19.

FIG. 4 shows reactor 23 containing three cylindrical fuel regions 23 embedded in a blanket 24 with a minimum of separation between each core at least several times the mean free path of neutrons at void conditions so as to avoid any substantial direct interaction between the individual fuel regions. The reactors 17 and 22 can be loaded conveniently using fuel rods 25, as shown in FIG. 5. The rod is filled with blanket material 26 at the bottom and top and core material 27 in the middle. The internal and external blankets can also be loaded with rods containing blanket material and arranged concentrically around the fuel regions. The size of the blanket rod could be slightly larger due to the lower temperature in the blanket than in the fuel region.

In the specfication, the fuel region is stated as containing fissile material and the blanket as containing fertile material. It is understood that both the fuel regions and the blanket contain fissionable and non-fissionable nuclear material. The fuel regions generally contain nuclear material having higher concentration of fissionable isotopes generally above 10% enrichment.

We claim:
1. A large fast breeder nuclear reactor comprising at least two fuel regions containing fissile material and being separated solely by an internal blanket of fertile material by a distance sufficient to avoid substantially direct interaction between said fuel regions, an external blanket of fertile material surrounding said fuel regions, and cooling means with water coolant in said reactor to remove the thermal nuclear energy generated therein, said reactor having a negative void coefficient of reactivity.

2. A large fast breeder nuclear reactor comprising at least two fuel regions of fissile material selected from the group consisting of uranium-235, uranium-233 and plutonium-239 containing materials, said fuel regions being separated solely by at least one internal blanket of fertile material by a sufficiently large distance to avoid substantially direct interaction between said fuel regions, an external blanket of fertile material surrounding said fuel regions, said fertile material in said internal blanket and external blanket being selected from the group consisting of thorium-232 and uranium-238 containing materials, and cooling means in said reactor using water coolant to remove the thermal nuclear energy generated therein, said reactor having a negative void coefficient of reactivity.

3. A large fast breeder nuclear reactor comprising at least two fuel layers of fissile material arranged in superimposed position separated solely by an interposing blanket layer of fertile material having a sufficient thickness to avoid substantially direct interaction of said fuel regions, an external blanket of fertile material surrounding said fuel regions, and cooling means with water coolant in said reactor to remove thermal nuclear heat generated therein, said reactor having a negative void coefficient of reactivity.

4. A large fast breeder nuclear reactor having a negative coolant void effect comprising at least two superimposed layers of fissile material selected from the group consisting of uranium-235, uranium-233 and plutonium-239 containing materials and being separated solely by at least one internal blanket layer of fertile material having a sufficient thickness to avoid substantially direct interaction between said layer of fissile material, an external blanket of fertile material surrounding said layers of fissile material, said fertile material being selected from the group consisting of thorium-233 and uranium-238 containing materials, and cooling means in said reactor with water coolant to remove the thermal nuclear energy generated therein.

5. A large fast breeder nuclear reactor having a negative coolant void effect comprising at least two superimposed layers of fissile material selected from the group consisting of uranium-235, uranium-233 and plutonium-239 containing materials and being separated solely by at least one internal blanket layer of fertile material having a thickness at least two times the mean free path of neutrons under void condition to avoid substantially direct interaction between said layers of fissile materials, an external blanket of fertile material surrounding said layers of fissile material, said fertile material being selected from the group consisting of thorium-233 and uranium-238 containing materials, and cooling means in said reactor with water coolant to remove the thermal nuclear energy generated therein.

6. A large fast breeder nuclear reactor of claim 4 wherein said fissile material is plutonium-239 containing material, said fertile material is selected from the group consisting of natural uranium and depleted uranium and said coolant is steam.

7. A large reactor of claim 4 wherein said fissile material is enriched plutonium-239 fuel elements, said internal blanket is natural uranium, said external blanket is depleted uranium, and said coolant is pressurized steam.

8. A large fast breeder nuclear reactor comprising at least two fuel regions arranged concentrically, being separated solely by an annular layer of fertile material of a sufficient thickness to avoid substantially direct interaction between said fuel regions, an external blanket of fertile material surrounding said fuel regions and cooling means with water coolant for removing the thermal nuclear energy generated therein, said reactor having a negative void coefficient of reactivity.

9. A large fast breeder nuclear reactor having a negative coolant void effect comprising at least two fuel regions of fissile material concentrically arranged and being separated solely by an annular layer of fertile material having a thickness at least two times the mean free path of neutrons under coolant void condition to avoid substantially direct interaction between said fuel regions, an external blanket of fertile material surrounding said fuel regions and cooling means with water coolant for removing the thermal nuclear energy generated therein, said fissile material and fertile material being selected from the group consisting of uranium-235, uranium-233 and plutonium-239 containing materials, and the group consisting of uranium-232 and thorium-239 containing materials, respectively.

10. A large fast breeder nuclear reactor of claim 9 wherein the fissile material is plutonium-239 containing material, said fertile material for the internal and external blankets is selected from natural uranium and depleted uranium, and the coolant is pressurized steam.

11. A large fast breeder nuclear reactor comprising at least two separate fuel regions of fissile material spaced apart from each other by a sufficiently large distance to avoid substantially direct interaction of said regions, at least one blanket of fertile material surrounding said separate fuel regions, said blanket being the sole means for separating said fuel regions and cooling means in said reactor with water coolant to remove the thermal nuclear energy generated therein, said reactor having a negative void coefficient of reactivity.

12. A large fast breeder nuclear reactor of claim 11 wherein said distance is at least two times the mean free path of neutrons under coolant void condition.

13. A large fast breeder nuclear reactor of claim 12 wherein said fissile material and fertile material are selected from the group consisting of uranium-235, uranium-233 and plutonium-239 containing materials, and the group consisting of uranium-238 and throium-232 containing materials, respectively, and the cooling means using water coolant.

14. A large fast breeder nuclear reactor of claim 13 wherein said fissile material is plutonium-239 containing material and said fertile material is selected from natural uranium and depleted uranium and the coolant is pressurized steam.

References Cited

UNITED STATES PATENTS 3,140,234 7/1964 Loewenstein _____ 176—40 X
3,140,237 7/1964 Peterson et al. _____ 176—18

OTHER REFERENCES

Nuclear Power, Oct. 1961, volume 6, No. 66, Page 75.

REUBEN EPSTEIN, *Primary Examiner.*